United States Patent [19]

Pidde et al.

[11] Patent Number: 5,709,628
[45] Date of Patent: Jan. 20, 1998

[54] HYDROSTATIC TRANSMISSION FOR CONSTRUCTION MACHINE

[76] Inventors: Gerd Pidde, Lindener Strasse 149a, D-44879 Bochum; Detlef Tolksdorf, Hertzeler Strasse 29, D-45141 Essen, both of Germany

[21] Appl. No.: 619,659

[22] PCT Filed: Feb. 9, 1995

[86] PCT No.: PCT/EP95/00470

§ 371 Date: Mar. 18, 1996

§ 102(e) Date: Mar. 18, 1996

[87] PCT Pub. No.: WO95/22704

PCT Pub. Date: Aug. 24, 1995

[30] Foreign Application Priority Data

Feb. 16, 1994 [DE] Germany .................. 44 04 829.7

[51] Int. Cl.$^6$ ........................................ F16H 47/02
[52] U.S. Cl. ........................ 475/75; 475/79; 475/83
[58] Field of Search ..................... 475/72, 75, 76, 475/79, 81, 83

[56] References Cited

U.S. PATENT DOCUMENTS

| | | |
|---|---|---|
| 3,596,535 | 8/1971 | Polak . |
| 3,748,924 | 7/1973 | Cross . |
| 4,291,592 | 9/1981 | Meyerle et al. .................. 475/81 |
| 4,976,664 | 12/1990 | Hagin et al. .................. 475/76 X |
| 4,983,149 | 1/1991 | Kita .................. 475/76 |
| 5,139,465 | 8/1992 | Sato .................. 475/24 |
| 5,193,416 | 3/1993 | Kanayama .................. 475/72 X |
| 5,248,283 | 9/1993 | Eckhardt et al. .................. 475/72 |
| 5,277,670 | 1/1994 | Tenberge .................. 475/219 X |
| 5,337,629 | 8/1994 | Kita .................. 475/72 X |
| 5,518,461 | 5/1996 | Pfordt .................. 475/72 |
| 5,584,772 | 12/1996 | Hayd .................. 475/76 X |

FOREIGN PATENT DOCUMENTS

| | | |
|---|---|---|
| 0 059 055 A3 | 9/1982 | European Pat. Off. . |
| 0 460 584 A1 | 12/1991 | European Pat. Off. . |
| 19 18 954 | 10/1970 | Germany . |
| 39 07 633 A1 | 9/1990 | Germany . |
| 92 08 554 U | 12/1993 | Germany . |

*Primary Examiner*—Khoi Q. Ta
*Assistant Examiner*—Peter T. Kwon
*Attorney, Agent, or Firm*—Herbert Dubno; Andrew Wilford

[57] ABSTRACT

A hydrostatic transmission has at least one pump, first and second motors connected to and driven by the pump and having respective first and second motor shafts, and a planetary-gear drive. This drive has a sun gear connected permanently to the first motor shaft, planet gears in mesh with the sun gear, a planet carrier carrying the planet gears and forming an output, and a ring gear meshing with the planet gears. First gearing and a first clutch are connected between the motor shafts and a brake connected to the ring gear is actuatable to arrest same. A second clutch is connected between the second motor shaft and the ring gear. In a first range the first clutch is closed, the second clutch is opened, and the brake is actuated to drive the sun gear with both shafts with the ring gear stopped. In a second range the first clutch is opened, the second clutch is closed, and the brake is released to drive the sun gear with the one shaft and the ring gear with the other shaft.

12 Claims, 3 Drawing Sheets

HYDROSTATIC TRANSMISSION FOR CONSTRUCTION MACHINE

CROSS REFERENCE TO RELATED APPLICATIONS

This application is the US national phase of PCT application PCT/EP95/00470 filed 9 Feb. 1995 with a claim to the priority of German application P 44 04 829.7 filed 16 Feb. 1994.

FIELD OF THE INVENTION

The present invention relates to a transmission for mobile construction machine.

BACKGROUND OF THE INVENTION

German 3,907,633 describes a steplessly variable hydrostatic propulsion drive with at least one constant-displacement motor connected via gearing of a predetermined transmission ratio permanently with a common output as well as at least one variable-displacement motor swingable back into a null position, a clutch being provided between the variable motor and the output. The variable motor has a larger transmission ratio of its gearing to the output than the constant motor permanently connected with the output. Alternatively thereto a first motor swingable back into a null position is connected hydraulically in parallel to a second variable motor.

When the variable motor reaches its end position it is immediately shifted to an adjustment angle alpha=0 or to a self-blocking condition and while doing this it is separated by a clutch from the output while simultaneously the deflection angle of the propulsion-drive pump is set back to the extent necessary to correspond to the final stroke volume of the variable motor. The deflection angle of the propulsion-drive pump is now either increasingly moved to the full deflection angle so that the final speed is achieved with the still connected constant-displacement motor. On a decrease in speed the described steps are carried out in reverse so that below a predetermined traction need in a lower speed range the clutch is again closed and while this is happening the variable motor is again brought into action. The disadvantage of this state of the art is generally that with two drives one of them is decoupled fully in the drive phase and as a result cannot be used any more for an increase in capacity.

European 0,137,406 describes an apparatus for the variable propulsion of large masses, in particular for driving the wheels of large-load vehicles, for driving construction machines, conveyors, or the like. The apparatus has a mainly one-stage planetary or gear transmission connected to a prime mover and at least two motor shafts which are each connected to a hydrostatic drive motor as well as a device for the preferably stepless adjustment of the rotation of at least one of the hydrostatic drive motors, at least one of the two motor shafts being connected directly with the sun gear of the planetary or gear transmission and the other of the motor shafts being connected with the rotatably mounted ring gear of the planetary or gear transmission and the planet carrier of the planetary or gear transmission being connected with one of the motor shafts for rotation thereby. One of the motor shafts or a part drivingly coupled to it, in particular the ring gear of the planetary drive can be arrested by a disk brake. The pumps are preferably variable over their full swing angle and as a result the motors powered by these pumps can be driven in both directions and even stopped and arrested by the disk brake at a zero-angle setting.

European 0,137,406 does allow high output speeds to be achieved because the principle of additive drives allows the input speeds of two hydromotors to be mechanically added to each other. The torque capacity of the drive is however at most as high as the smaller torque capacity of the two drive units taking into account the mechanical translation between the motor shafts. This is due to the fact that the two motors are braced against each other and the corresponding torque is transmitted to the output shaft which to take into account the mechanical translation must be smaller than the torque capacities of the two motors. If the torque of the output shaft, taking into account the mechanical translation with which the two motors are applied to the output shaft, exceeds the torque capacity of one of the two motors, the motor is mechanically driven. In this case one has what is called in additive drives a blind loading. In order to avoid such back driving via the output shaft and to allow higher torques a disk brake can be actuated so that the unbraked motor is braced by the brake and the other motor is arrested. The disadvantage of this state of the art is that one drive must be completely stopped during an operating phase and thus in this operating phase its drive capacity is no longer available.

OBJECTS OF THE INVENTION

It is an object of the invention to develop a hydrostatic transmission, in particular for mobile construction machines such as wheeled loaders, mobile conveyors, graders, self-propelled cranes, or the like wherein the transmission ratio is substantially greater than in known transmissions so that even with a relatively small drive capacity construction machines of great weight can be driven and only one shift stage is needed.

SUMMARY OF THE INVENTION

This object is attained in a transmission in particular for mobile construction machines having at least two hydromotors connected together at motor shafts by at least one gear pair and driven by at least one pump and connected together in a first speed range of the construction machine via a clutch for adding together the torques of both hydromotors and at least one planetary drive having an output shaft and having a ring gear arrestable by at least one brake, wherein in a speed range after the first range of the construction machine at least one of the hydromotors is disconnected by the clutch from the motor shaft of the other hydromotor and is coupled by a further clutch in the region of its output shaft to the ring gear of the planetary drive for mechanical addition of the rotations of both hydromotors in accordance with the principles of force addition.

The transmission according to the invention can be driven with its hydromotors even in open or closed circuits.

The drive concept using open and closed hydrostatic circuits with one or more pumps can work for example with small and medium-sized construction machines, as e.g. a wheeled loader with a service capacity equal to or less than 12 t. At least two closed hydrostatic circuits with respective pumps can preferably be used for heavier construction machines. The selection depends on application and the type of construction machine.

Construction machines can be classified according to how they are used, mainly by the dynamic travel load. Thus for example a wheeled loader has a substantially higher dynamic travel load than a self-propelling crane. These features make it possible for the person skilled in the art to take into account all criteria of different travel loads.

According to the invention a method of controlling a transmission is shown wherein with at least two hydromotors connected together at motor shafts each by at least one gear pair and connected together by a clutch and with at least one planetary drive having at least one output shaft and having a ring gear arrestable by at least one brake, the hydromotors are connected in a lower speed range (range I) with addition of torque and one of the hydromotors is switchable via a further clutch so that the hydromotors are driven with addition of torque in an upper speed range (range II).

Thus at the start of the first range there is addition of the torques of the hydromotors with both motor shafts of the transmission connected in a solid force-transmitting connection with each other via a clutch and gear pair. The ring gear of the planetary drive is in this condition arrested by a brake. Stepless rotation increase is achieved in that the hydropumps are swung out and the hydromotors are swung in. At most on reaching the maximum rotation speed one of the two hydromotors is disconnected by a clutch from the motor shaft of the other hydromotor and set at a speed n=0 rev/min. A further clutch connects the disconnected hydromotor to the ring gear of the planetary drive and the brake is released that was hitherto arresting the ring gear. The rotation speed of this second hydromotor is then increased steplessly by swinging out of the hydropump and decreasing its flow volume. The rotation speeds of both hydromotors are thus mechanically added in accordance with the principles of force addition.

Reduction of the rotation speed is achieved by first steplessly decreasing the added rotation speed by increasing the volume flow of the second hydromotor and correspondingly swinging in of the respective hydropump. When the rotation speed n=0 rev/min in the second hydromotor, the ring-gear brake is again actuated and the clutch is released so force flows between the second hydromotor and the ring gear. Then the rotation rate of the second hydromotor is increased and the clutch is actuated so as to interconnect the two motor shafts and again add the torques of the two hydromotors.

Construction machines in particular work according to a traction-force/speed curve which corresponds at all locations to the maximum load, taking into account the efficiency of the system. Since in the lower speed range the traction requirement is great so that the torque capacity of the drive must be great at low speed, in the lower speed range the system is set to add torques. As speed or rotation rate increases the torque decreases disproportionately. When a torque level is reached which corresponds to the torque capacity of the first hydromotor, the second motor can be set to recirculate and further increases in speed are effected with the first hydromotor or both motors can do this. How this is done depends on an optimization of the overall efficiency, e.g. depending on whether with two driven motors the operating pressure of the individual motors is reduced relative to only one driving motor or the swing angle of the motors can be set far enough over in order to optimize efficiency. If the top speed of one or both hydromotors is reached the increase of the rotation rate determines the shifting to addition of the rotations.

With the transmission according to the invention the hydrostatic motors can be driven in closed and/or open circuits. In the latter case the working pump serving to supply the hydraulics of the construction machine, preferably the reversible hydraulic motor, is operated with a pressure medium (hydraulic fluid). This feature gives relative to a closed circuit the advantage that an already existing pump can be used so that no special-duty pump need be integrated into the circuit. The variable hydraulic motor can according to the feature of the invention be a constant-displacement motor.

When the working pump supplying the hydraulics for the construction machine is used to control the hydraulic motor the multivalve controller provided for the machine's hydraulics can easily be adapted for this extra function.

BRIEF DESCRIPTION OF THE DRAWING

The invention is shown with reference to an embodiment in the drawing and is described as follows. Therein.

SPECIFIC DESCRIPTION

Figure 1:
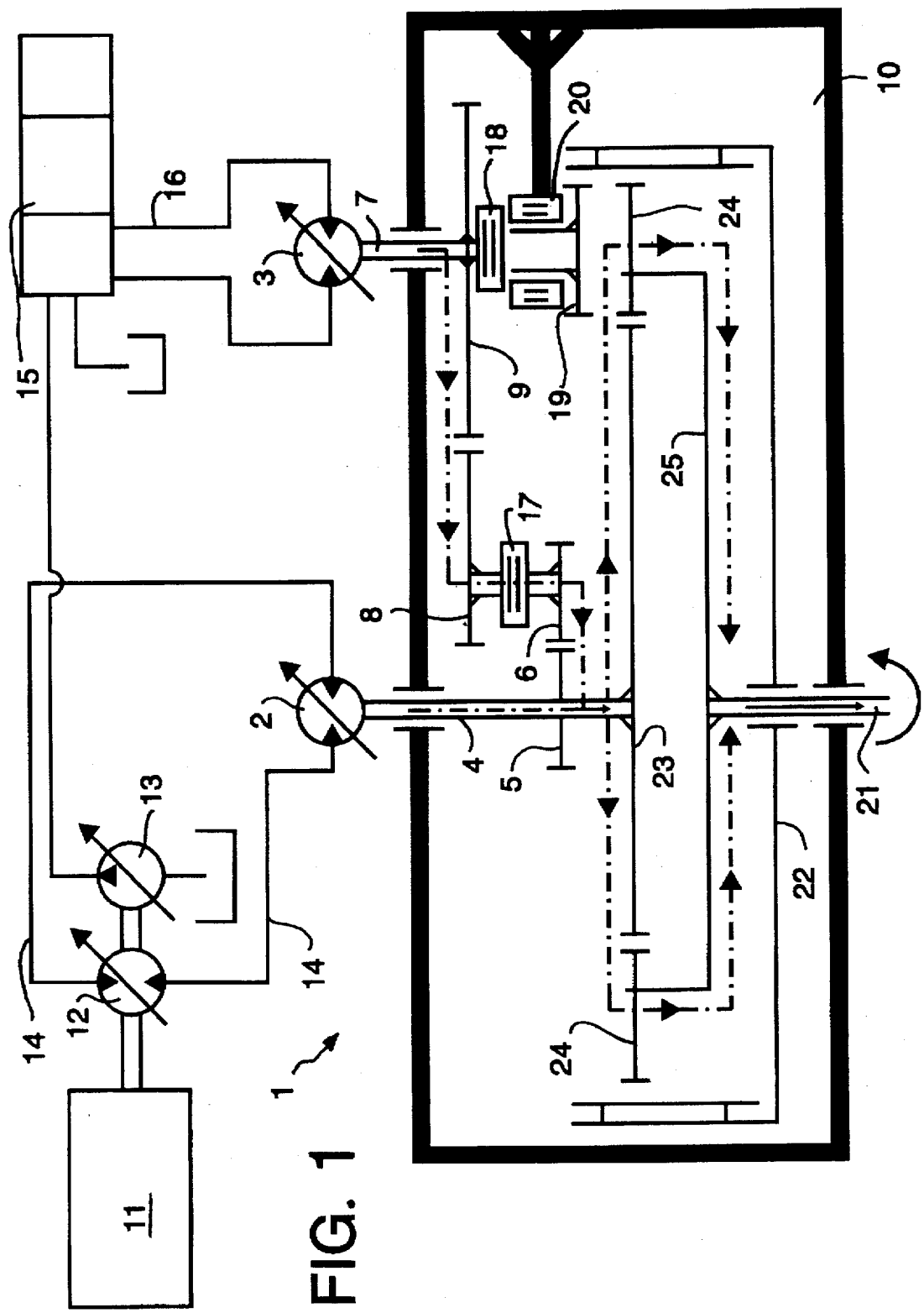
FIG. 1 is a schematic diagram of the transmission according to the invention set in a first-range slow speed.

FIG. 1 shows one possible variant of the transmission 1 according to the invention as used in a wheeled loader with a service load corresponding to a mass m=7.5 t that is generally formed by the following components:

two hydromotors 2 and 3 of which the hydromotor 2 is variable and the other hydromotor 3 is not, a first pair of gears 5 and 6 connected with the motor shaft 4 of the hydromotor 2, a second pair of gears 8 and 9 connected with the motor shaft 7 of the hydromotor 3, as well as a planetary drive 10 connected thereto. A diesel engine 11 drives a propulsion pump 12 as well as a further pump 13 serving for other not shown working machines. The propulsion pump 12 drives the variable hydromotor 2 in a closed circuit 14 while the working pump 13 drives the nonvariable hydromotor 3 with hydraulic fluid via the control unit 15 in an open hydraulic circuit 16.

It is also possible in the alternative to use instead of the working pump 13 a second propulsion pump 12 which is then also connected in a closed circuit with the hydromotor 3. The selection of pumps and hydromotors should be made in any case dependent on application.

The gear pairs 5/6 and 8/9 are connected together by a preferably hydraulically actuatable clutch 17. In this embodiment there is in the region of the motor shaft 7 after the gear 9 a further also hydraulically actuatable clutch 18 connecting the motor shaft 7 to a further gear 19. Between the clutch 18 and the gear 19 there is a disk brake 20.

The transmission shown in FIG. 1 is set in range I of the wheeled loader. The load flow in this range is shown by the arrows. The hydromotor 2 thus directly drives via its shaft 4 a sun gear 23 of the planetary drive 10. The torque from the hydromotor 2 is transmitted via planet gears 24 to a planet carrier 25 of the planetary drive 10 and thence in this embodiment to a single output shaft 21. The hydromotor 3 drives via its motor shaft 7, the gear pair 8/9, and via the then closed, that is actuated, clutch 17 the gear pair 5/6 effective on the motor shaft 4 of the hydromotor 2. Depending on the predetermined operating parameters of the hydromotors 2 and 3 there is a transmission ratio between the motor shafts 4 and 7. The torques of the two hydromotors 2 and 3 are thus added in the region of the motor shaft 4 and as shown are transmitted to the output shaft 21 of the planetary drive 10. The ring gear 22 is in this case arrested by the brake 20 and the clutch 18 is decoupled, that is it is inactive.

Figure 2:
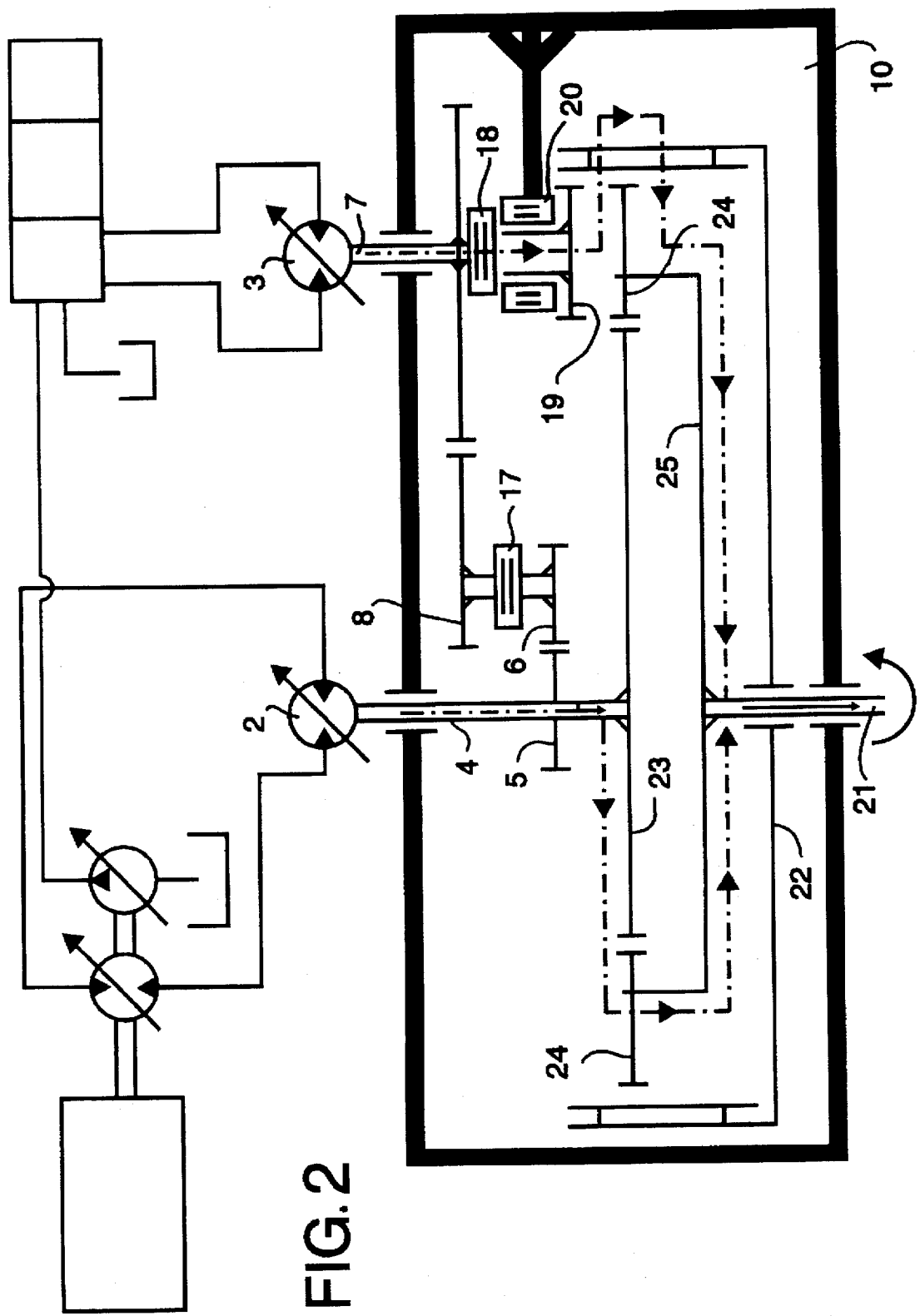
FIG. 2 is a schematic diagram of the transmission according to the invention set in a second-range higher speed.

FIG. 2 shows the same transmission as shown in FIG. 1 so that the same reference numerals apply. Here however range II of the wheeled loader is described. As in FIG. 1, in FIG. 2 the load flow for this drive range is shown with arrows. The rotation of the hydromotor 2 is transmitted directly from the motor shaft 4 via the sun gear 23 and planet gears 24 to the planet carrier 25 and thus the output shaft 21. The rotation of the hydromotor 3 since the clutch 17 is now inactive, that is decoupled, is transmitted via the gear 19 to the ring gear 22 and thus is added to the rotation of the hydromotor 2. The planet gears 24 transmit the rotation to the planet carrier 25 and thus to the output shaft 21.

A transmission 1 is thus proposed which in this embodiment in a first speed phase (range I) is driven by both hydromotors 2 and 3, with the torques from the hydromotors 2 and 3 being added by the gear pairs 5/6 and 8/9 via the clutch 17 to a total torque. The total torque is fed via the planetary drive 10 to the output shaft 21 of the transmission 1. The ratios of the gear pairs 5/6 and 8/9 are preferably set such that both hydromotors 2 and 3 are fully used with respect to their maximum rotation speed until the end of the first range so that their load capacity is also used in the first speed phase in contrast to the state of the art. In the second speed phase (range II) the hydromotor 3, unlike in the state of the art, is not shut off but is switched over in that the clutch 17 is released, the clutch 18 is actuated, and the brake 20 is then released. In this phase the system functions as an adding transmission. The rotation from the hydromotor 3 is fed via the gear 19 to the ring gear 22 of the planetary drive 10 and is added to the inputted rotation of the hydromotor 2 mechanically so as to produce a high output rotation and as a result a high speed in range II. The advantage relative to the state of the art is that the hydromotor 3 is not turned off and rendered useless in a first speed phase and works in both ranges I and II and in fact in range I increases with its torque the total torque or pulling force of the unillustrated vehicle and in range II increases with its rotation the total rotation or speed of the vehicle.

Below using as a departure point FIGS. 1 and 2 a shifting strategy is reproduced for the transmission 1 according to the invention.

A) Starting from full stop.

Starting condition: The propulsion pump 12 is swung in; the hydromotors 2 and 3 are swung all the way out; the hydromotor 3 is set to recirculate via the controller 15; the clutch 17 and the brake 20 are actuated; the clutch 18 is released.

The propulsion pump 12 is steadily swung out and the hydromotor 2 speeds up. When here its pressure is greater than 70% and the speed of the construction machine is less than 20% of its maximum speed, the controller 15 turns off the hydromotor 3.

The torques of the hydromotors 2 and 3 are added via the clutch 17.

The vehicle is accelerated with both hydromotors 2 and 3 until it reaches about 20% of its maximum speed (corresponding to a pulling capacity of less than 50%).

The hydromotor 3 is switched by the controller 15 to recirculation (the hydromotor 2 can now assume the maximum pulling capacity alone).

As the speed increases further the clutch 17 is opened and then the clutch 18 is actuated.

Before reaching the maximum speed of the hydromotor 2 the hydromotor 3 is pressurized via the controller 15.

On reaching the maximum speed of the hydromotor 2 the brake 20 is released and the ring gear 22 is accelerated by the hydromotor 3 until the maximum output speed of the planetary drive 10 (adding drive) is reached.

B) Braking at high speed.

The rotation of the hydromotor 3 is set to zero by the controller 15.

The brake 20 is actuated.

The hydromotor 3 is set on recirculation by the controller 15.

The clutch 18 is opened and then the clutch 17 is actuated.

The hydromotor 2 is effective alone on the output shaft 21.

On reaching a speed smaller than 20% the hydromotor 3 is pressurized by the controller 15 when simultaneously the pressure in the hydromotor 2 is greater than 70%, that is when the traction need is greater than 50%.

Figure 3:
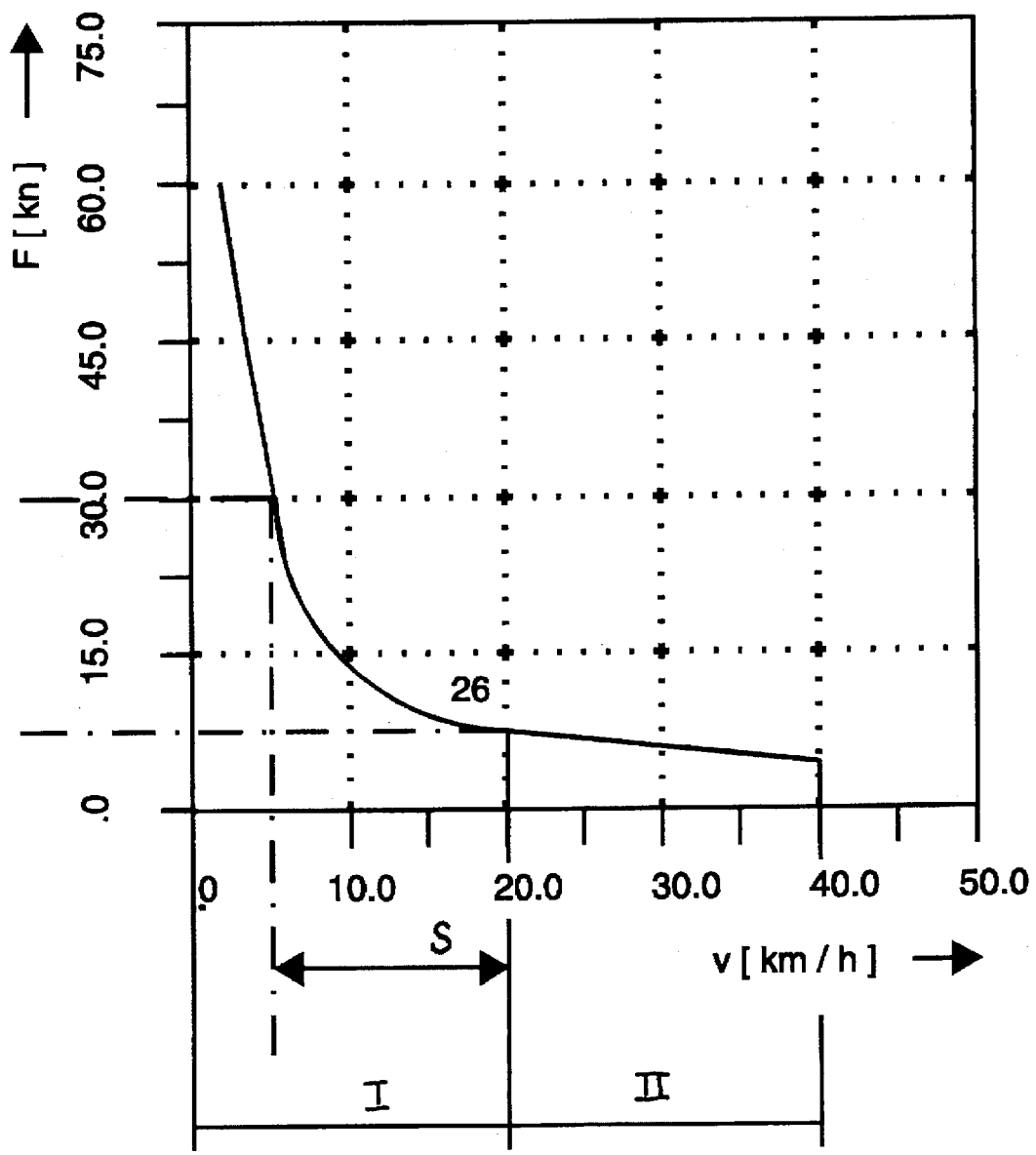
FIG. 3 is a load curve for the transmission according to the invention according to FIGS. 1 and 2.

FIG. 3 shows the load curve 26 of the transmission 1 according to FIGS. 1 and 2. The abscissa shows the speed v in km/h and the ordinate the traction force F in kN. One can see that the traction need at low speed is high and decreases markedly at higher speeds since with increasing rotation or speed the torque to be transmitted decreases disproportionately. The shifting scheme assumes a propulsion load of the wheeled loader of about P=42 kW, and the maximum traction F=60 kN and the maximum road speed v=40 km/h. Two speed ranges (ranges I and II) are shown with range I being below 20 km/h and range II lying between v=20 km/h and v=40 km/h. The shifting region S thus lies between v=5 km/h and v=20 km/h so that a greater speed range is available for the shifting phase and damage to the hydromotors and/or pumps is surely avoided. One can see that the traction need has sunk at a speed of v=5 km/h to half of the starting value so that a relatively large shifting range remains for carrying out the actual shifting operation of the hydromotor 3 and with it the speed increase up to the final speed in the second range.

We claim:

1. A hydrostatic transmission comprising:

at least one pump;

first and second motors connected to and driven by the pump and having respective first and second motor shafts;

a planetary-gear drive having
 a sun gear connected permanently to the first motor shaft,
 planet gears in mesh with the sun gear,
 a planet carrier carrying the planet gears and forming an output, and
 a ring gear meshing with the planet gears;

first gearing and a first clutch connected between the motor shafts;

a brake connected to the ring gear and actuatable to arrest same;

a second clutch connected between the second motor shaft and the ring gear; and control means connected to the pump, clutches, and brake for
 in a first range closing the first clutch, opening the second clutch, and actuating the brake for driving the sun gear with both shafts with the ring gear stopped, and
 in a second range opening the first clutch, closing the second clutch, and releasing the brake for driving the sun gear with the one shaft and the ring gear with the other shaft.

2. The hydrostatic transmission defined in claim 1 wherein on shifting from the first range to the second range the control means first closes the second clutch and thereafter opens the brake.

3. The hydrostatic transmission defined in claim 1 wherein the second clutch has an input side connected to the second shaft and an output side carrying a gear meshing with the ring gear.

4. The hydrostatic transmission defined in claim 1, further comprising a second pump connected to the second motor, the first pump being connected only to the first motor.

5. The hydrostatic transmission defined in claim 4 wherein the first pump and motor are connected together in a closed hydraulic circuit.

6. The hydrostatic transmission defined in claim 4 wherein the first motor is a variable-displacement motor and the second motor is a constant-displacement motor.

7. The hydrostatic transmission defined in claim 4 wherein both motors have the same top speed and the gearing provides a 1:1 ratio.

8. The hydrostatic transmission defined in claim 4 wherein the gearing has such a ratio that both motors reach their top speed at the same time.

9. The hydrostatic transmission defined in claim 4 wherein the gearing has such a ratio that the second motor reaches its top speed before the first motor.

10. The hydrostatic transmission defined in claim 4 wherein the gearing and the ratio of the planetary drive are such that the transmission ratio between the first shaft and the output is smaller than the ratio between the second shaft and the output.

11. A method of operating a hydrostatic transmission having at least one pump;

first and second motors connected to and driven by the pump and having respective first and second motor shafts;

a planetary-gear drive having a sun gear connected permanently to the first motor shaft, planet gears in mesh with the sun gear, a planet carrier carrying the planet gears and forming an output, and a ring gear meshing with the planet gears;

first gearing and a first clutch connected between the motor shafts;

a brake connected to the ring gear and actuatable to arrest same;

a second clutch connected between the second motor shaft and the ring gear, the method comprising the steps of in a first range closing the first clutch, opening the second clutch, and actuating the brake for driving the sun gear with both shafts with the ring gear stopped, and in a second range opening the first clutch, closing the second clutch, and releasing the brake for driving the sun gear with the one shaft and the ring gear with the other shaft.

12. The method defined in claim 11 further comprising the steps of:

in the first range when starting from a stop driving only the first motor by the pump with increasing speed while maintaining the second motor stopped and after the first motor reaches a predetermined speed driving the second motor with increasing speed; and shifting from the first range to the second range by stopping the second motor and thereafter opening the first clutch, closing the second clutch, and releasing the brake.

* * * * *